United States Patent [19]  
Satori

[11] 4,019,369  
[45] Apr. 26, 1977

[54] PNEUMATIC TRANSMITTER FOR VARIABLE AREA FLOWMETER

[75] Inventor: Toshio Satori, Yokohama, Japan
[73] Assignee: Fischer & Porter Co., Warminster, Pa.
[22] Filed: July 8, 1976
[21] Appl. No.: 703,529
[52] U.S. Cl. .................................... 73/37; 73/209
[51] Int. Cl.$^2$ ................... G01B 13/16; G01F 1/24
[58] Field of Search .................... 73/37, 37.5, 209; 116/124 A, 129 R; 137/842

[56] References Cited
UNITED STATES PATENTS

| | | | |
|---|---|---|---|
| 3,315,523 | 4/1967 | Conkling | 73/209 |
| 3,416,358 | 12/1968 | Davis et al. | 73/37 |
| 3,491,784 | 1/1970 | Lilly | 137/842 |

*Primary Examiner*—Herbert Goldstein

[57] ABSTRACT

A variable-area flowmeter system adapted to produce a pneumatic output indication that is linearly proportional to flow rate. The primary of the system includes a float contained in a variable area tube through which flows the fluid to be metered, the float being raised or lowered in the tube as a function of flow rate. A bar magnet is physically coupled to the float and moves axially therewith. The secondary of the system includes a rotatable follower magnet magnetically coupled to the bar magnet to convert the axial movement into rotary motion and an edge-profiled input disc mounted on the shaft of the follower magnet whereby the disc rotates in a direction and to an extent depending on flow rate. The profile is designed to afford a linear relationship between input rotation and output pressure. Associated with the profiled disc is an edge sensor which pneumatically senses the profile of the disc to provide a pneumatic ouput signal proportional to flow rate, the sensor being constituted by an air jet nozzle and a jet collector spaced therefrom to define a gap within which the edge of the disc is inserted to vary the collected pressure in accordance with the profile. The jet nozzle is cocked relative to the plane of the disc to counteract the tendency of the jet stream to rotate the disc.

10 Claims, 6 Drawing Figures

PNEUMATIC TRANSMITTER FOR VARIABLE AREA FLOWMETER

BACKGROUND OF THE INVENTION

This invention relates generally to a pneumatic transmitter operating in conjunction with a magnetic follower associated with a variable-area flowmeter to produce a pneumatic signal which is a function of flow rate, and more particularly to a compensated pneumatic transmitter producing a pneumatic signal which accurately reflects flow rate.

In a variable area meter for measuring flow rate, only the orifice area is varied as a function of flow, a constant pressure difference being maintained. The typical variable area meter is constituted by an upright, tapered tube containing a weighted float which is raised to a position of equilibrium between the downward force of the float and the upward force of the fluid flowing past the float through the surrounding annular orifice. The flow restriction is the area of the annular orifice, this area being enlarged as the float rises in the tapered tube. The pressure differential is fixed, this being determined by the weight of the float and the buoyant forces.

In many flowmeter applications it is necessary to translate the changing vertical position of the float within the flow tube into a corresponding external indication. Where, for example, the process fluid is opaque, the float cannot be seen through the transparent tube, hence direct visual indication along the tube is precluded. In other situations, the flow tube must be made of metal or other opaque material, so that it is then necessary to provide means for registering the float position at a point external to the tube.

Mechanical coupling of the float to an external indicator is generally unsatisfactory, since frictional and other loads thereby imposed on the float interfere with its free motion and distort the flow rate reading. In order to minimize loading the float, it is known to use a magnetic, nonmechanical coupling between the movable float and an external indicator.

Thus both the Conkling U.S. Pat. No. 3,315,523 and the Busillo U.S. Pat. No. 3,164,989 disclose arrangements in which the float in the variable tube is provided with a guided extension rod to which a bar magnet is attached, the bar magnet moving up and down in accordance with changes in the vertical float position. The bar magnetic cooperates with a rotatable follower magnet mounted on a shaft to which an indicating pointer is attached. The follower magnet is caused to rotate in a direction and to an extent which is a function of the bar magnet movement and hence of flow rate.

The difficulty experienced with magnetic followers of the type disclosed in the Conkling and Busillo patents is that when the hydraulic characteristics of the flowmeter are aligned to the follower output by small manipulations of zero and span adjustment, the movement of the float from its minimum to its maximum position is accompanied by an indicator movement having a bowed characteristic that is essentially symmetrical with respect to the 50% flow rate position. In other words, though the lift of the float in the tube has a straight-line relationship to the indication, the float lift exhibits a non-linear or curved relationship to flow rate which takes the form of a bow-shaped curved extending between the extremities of float travel.

In the copending U.S. Pat. application of Metzger, Ser. No. 564,668, filed Apr. 3, 1975, also assigned to Fischer and Porter Company, the assignee herein, there is disclosed a magnetic follower arrangement for a variable area flowmeter which includes simple correction means adapted to bring about a linear relationship between the flow rate and the output indication independently of the adjustment of zero and span. In the Metzger arrangement, the vertical movement of a float in a variable area flow tube is converted by a magnetic follower into rotary motion for operating a pointer along a scale, the follower being compensated for by an eccentric mass to effect the desired linear relationship.

In the Metzger arrangement, the reading of the variable area flowmeter is produced by a pointer which rotates with respect to a circular scale. However, there are many situations in industrial process systems where it is necessary to convert the reading of a meter into a corresponding pneumatic signal suitable for transmission to a remote station for operating indicator or control mechanisms.

SUMMARY OF THE INVENTION

In view of the foregoing, it is the main object of this invention to provide a pneumatic transmitter which is coupled to a magnetic follower associated with a variable area flowmeter, the transmitter serving to convert the rotation of the follower which corresponds to the rise and fall of the flowmeter float into a pneumatic signal whose value is proportional to flow rate.

More particularly, it is an object of this invention to provide a pneumatic transmitter of the above type in which an input disc is coupled to the shaft of the magnetic follower to rotate therewith, the edge profile of the input disc reflecting a linear relationship between input relation and output pressure, the disc profile being sensed by a pneumatic edge sensor associated with a pneumatic feedback system generating the desired pneumatic signal.

Also an object of this invention is to provide an edge sensor constituted by an air jet nozzle which emits a jet of air which is picked up by a jet collector, the edge of the disc being inserted in the gap between the nozzle and the collector to produce an output depending on the intercepted profile of the disc. A significant feature of the invention resides in the fact that the nozzle is cocked to counteract the effect of the sucking force produced by the jet stream impinging on the edge of the disc.

Yet another object of this invention is to provide an efficient, reliable and low-cost variable area flowmeter system adapted to produce a pneumatic output indication that is linearly proportional to flow rate.

Briefly stated, these objects are attained in a system whose primary includes a float contained in a variable area tube through which flows the fluid to be metered, the float being raised or lowered in the tube as a function of flow rate. A bar magnet is mechanically coupled to the float and moves axially therewith.

The secondary of the system includes a rotatable follower magnet magnetically coupled to the bar magnet and an edge-profiled input disc mounted on the shaft of the follower magnet whereby the disc rotates in a direction and to an extent depending on the rise and fall of the float, and hence as a function of flow rate. The profile of the disc is designed to afford a linear relationship between input rotation and output pressure.

Associated with the disc is an edge sensor constituted by a jet nozzle emitting a stream of air which is picked up by a jet collector spaced from the nozzle to define a gap within which is inserted the edge of the disc, whereby the air pressure recovered by the collector increases as the disc edge withdraws from the air stream and decreases as the edge moves toward the air stream. The jet nozzle is cocked relative to the plane of the disc to counteract the tendency of the jet stream to rotate the disc.

The edge sensor is mounted on a pivoted feedback arm which is actuated by a feedback bellows responsive to the output of the collector, whereby as the collected pressure changes, the bellows acts to shift the arm in a direction and to an extent causing the edge sensor to assume a position with respect to the edge of the input disc at which the pressure balance of the system is restored, the pressure then applied to the bellows representing the output of the system.

OUTLINE OF DRAWING

For a better understanding of the invention as well as other objects and further features thereof, reference is made to the following detailed description to be read in conjunction with the accompanying drawings, wherein:

FIG. 1 is a schematic illustration of a variable area flowmeter provided with a magnetic follower whose pointer shaft has mounted thereon the input disc of a pneumatic transmitter in accordance with the invention;

FIG. 2 schematically illustrates the pneumatic transmitter;

FIG. 3 separately shows the edge sensor associated with the input disc in the pneumatic transmitter;

DESCRIPTION OF INVENTION

The Magnetic Follower for the Variable Area Flow Tube

Figure 1:
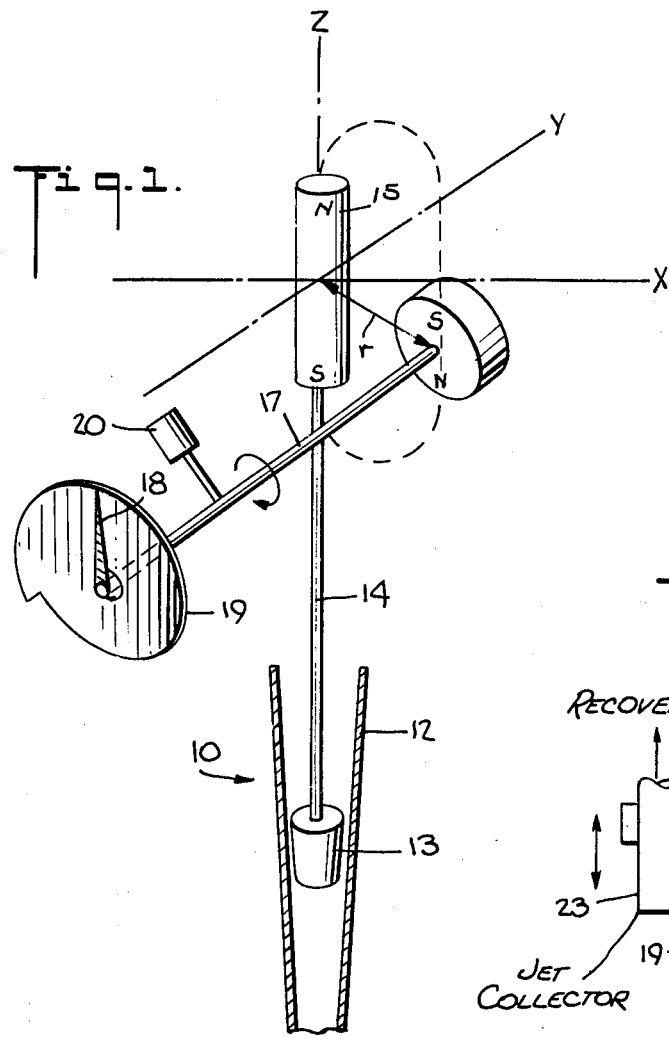

Referring now to FIG. 1, there is shown the main elements of a conventional variable area flowmeter, generally designated by numeral 10 and of a magnetic follower 11. The system operates on the variable area principle to sense and indicate the instantaneous flow rate of fluid passing through the flowmeter.

Flowmeter 10 includes a downwardly-tapered meter tube 12 which may be formed of transparent or opaque material and a float 13 which moves up and down the tube. The variable area meter is provided with the usual pipe fittings (not shown) to admit the fluid to be measured into a lower end of the tube and to discharge this fluid from the upper end thereof.

Metering float 13 is provided with a guided extension rod 14 which extends upwardly therefrom and passes out of the top end of the flow tube. Attached to the free end of rod 14 is a vertically-oriented bar magnet 15 which is caused to move axially along a vertical axis Z in accordance with the rise and fall of the float. For purposes of illustration, the polarization of this bar magnet is made such that North is at the upper end, and South at the lower end. While the drawing shows bar magnet 15 outside of flow tube 12, in practice the arrangement may be such as to place this magnet within the tube.

Associated with bar magnet 15 is a follower assembly including a wheel-shaped follower magnet 16 mounted at one end of a shaft 17 to whose other end is attached a pointer 18 which is movable with respect to a scale (not shown). Mounted on shaft 17 adjacent pointer 18 is an edge-profiled disc 19 which functions as the input element of a pneumatic transmitter, to be later described. A mass 20 is supported on a threaded rod 21 coupled to shaft 17 and extends laterally therefrom at an angle of 90° with respect to the pointer, whereby the mass is eccentrically mounted relative to the axis of the shaft. The position of the mass on the rod is adjustable.

The attraction between the opposing poles of the bar magnet 15 and the follower magnet 16 provides a magnetic coupling therebetween so that when the bar magnet moves axially in the downward direction along axis Z, follower magnet 16 is caused to turn in the counter-clockwise direction to swing pointer 18 toward zero on its associated scale, and when bar magnet 15 moves upwardly, follower magnet 16 is caused to turn in the clockwise direction to swing pointer 18 upwardly on the scale.

In FIG. 1, the float is shown at its 50% lift position, with the follower assembly being statically balanced. In order for pointer 18 to register with the 50% position on its associated scale when float 13 is at its 50% lift position, the center of rotation of follower magnet 16 must be aligned with the midpoint of the magnet at the point of intersection between the vertical Z axis passing through bar magnet 15 and the orthogonal horizontal axes X and Y. The follower assembly is placed in its proper elevation relative to the bar magnet by raising or lowering the assembly in the Z direction. The mechanical means for this purpose are conventional and are therefore not illustrated.

The radial line between the point of intersection of axes X, Y and Z in the bar magnet and the center of rotation of follower magnet 16 is represented by symbol $r$. Only one location on radius $r$ will produce a 180° rotation corresponding to a given lift (L) with a substantially linear relationship. A horizontal setting of the follower assembly in the $r$ or x direction is thereofre used to adjust the span of the follower assembly. The zero position will align by symmetry. Hence the two adjustments in the Z and X or $r$ direction provide a linear relationship between float lift and follower rotation.

As explained in the above-identified Metzger application, whose entire disclosure is incorporated herein by reference, the actual hydraulic characteristic of the variable area flowmeter is such that its curve has a bowed formation. The ideal relationship between flow rate and float lift is one which is perfectly linear. While the actual curve between the zero and maximum float lift position starts at zero and ends at the same point as the ideal curve, because of the bow formation of the actual curve, the departure from linearity is greatest at 50%. To compensate for this characteristic bow, the moment of mass 20 on the shaft of the follower is adjusted to impart to the curve representing the relationship between float lift and follower rotation an identical bow formation.

The Pneumatic Transmitter

Figure 2:
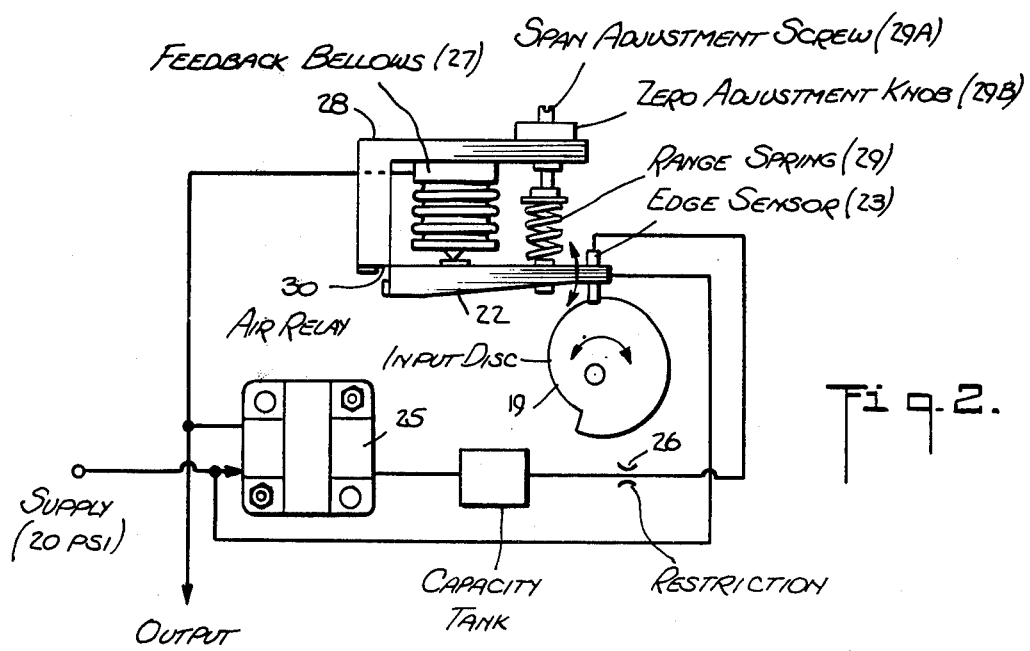
Figure 6:
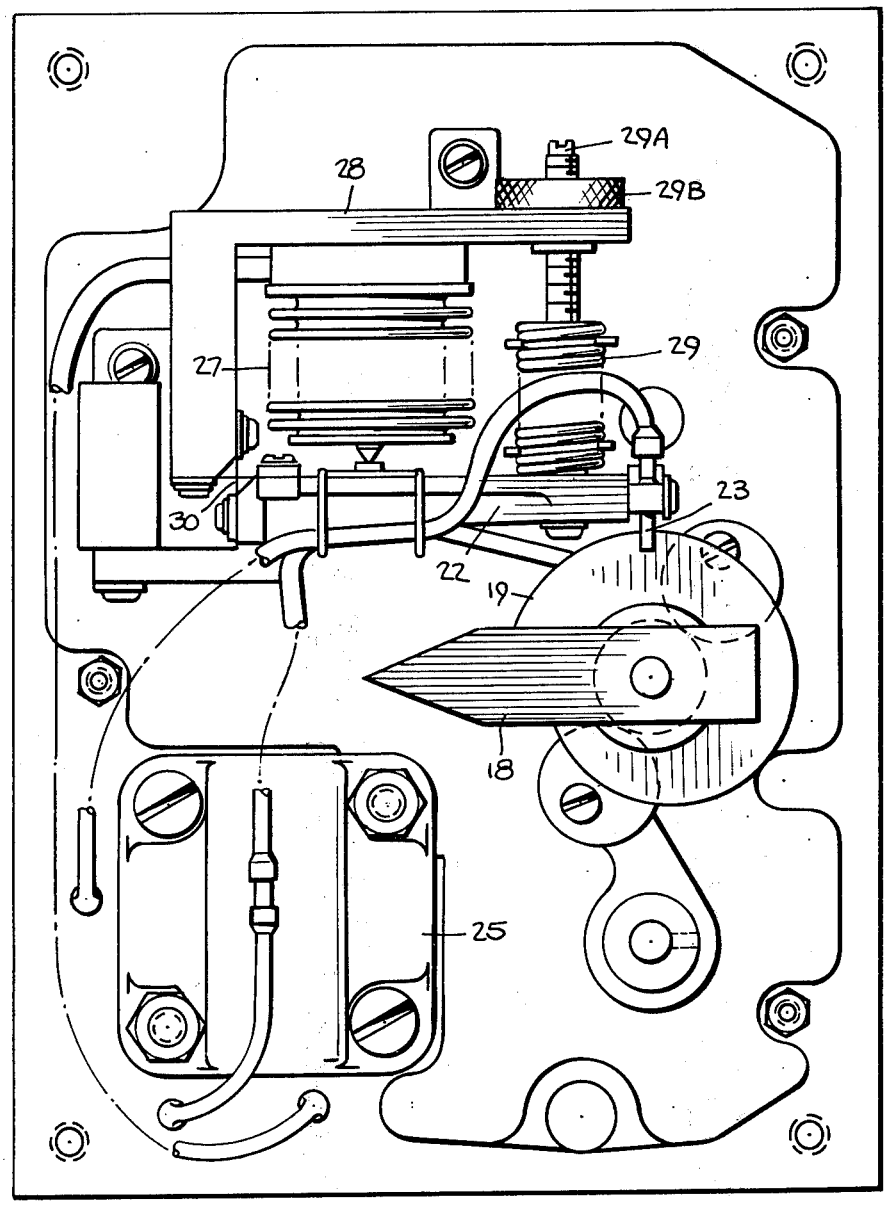
FIG. 6 is an elevational view of an actual model of a pneumatic transmitter in accordance with the invention.

As illustrated in FIGS. 2 and 6, the edge profile on disc 19 is such as to provide a linear relationship between the input rotation and the pneumatic output throughout substantially the full scale of the flow measuring system. Since, in practice, the primary of the system, which is the variable area flowmeter, tends to become somewhat inaccurate below 10% of full scale, the pneumatic transmitter, which in conjunction with the magnetic follower constitutes the secondary of the system, may be provided with drop-out means to cut off the output at a little less than 10%, typically at 8% of full scale.

Figure 3:
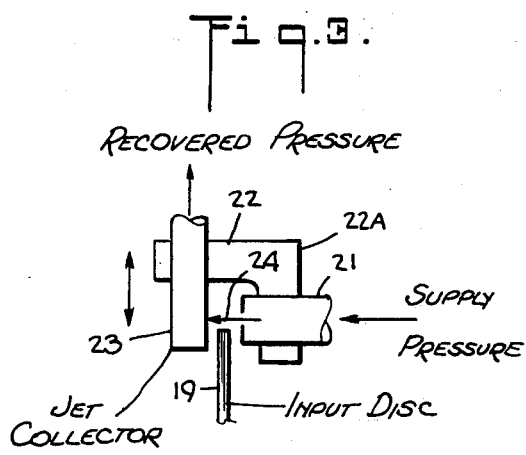

As shown schematically in FIG. 3, input disc 19 co-operates with an edge sensor constituted by an air jet nozzle 21 which is mounted at the right-angled end 22A of a feedback arm 22 to produce a jet stream which is picked up by a jet collector 23 which is mounted on the arm at a position relative to the nozzle to define an air gap 24. Inserted within gap 24 is the profiled edge of input disc 19. As the disc rotates in the counterclockwise direction, the profiled edge progressively moves farther into gap 24 to interrupt a greater amount of the air stream and thereby diminish the pressure of air recovered by collector 23; whereas when the disc rotates in a clockwise direction, the relationship is reversed.

Jet nozzle 21 is supplied by pressurized air from a source (20 psi) which also energizes a pneumatic relay 25. The output of collector 23 is fed through a restriction 26 and a capacity tank 31 to the input of relay 25 whose output, which is in the 3 to 15 psi range, is fed to a feedback bellows 27. This output is transmitted to an external point for control point or indicating purposes.

Bellows 27 is mounted on the long leg of an L-shaped frame 28. Feedback arm 22 is pivoted to the short leg of frame 28 by means of crossed-springs 30, and is driven by bellows 27 in a manner whereby as the pressure applied to the bellows by relay 25 increases, the bellows expand to swing arm 22 downwardly in a direction causing a greater insertion of the edge of disc 19 into gap 24.

A range spring 29 is provided which is bridged between frame 28 and arm 22, whereby the span of the system may be set as desired. Also provided in a span-adjusting screw 29A and a zero adjustment knob 29B.

Thus the pneumatic system constitutes a negative feedback loop, for when a condition arises in which the edge of disc 19 is somewhat withdrawn from gap 24, the resultant air pressure from collector 23 is relatively high, as a consequence of which the bellows is expanded to cause arm 22 to swing down and thereby increase the insertion of the disc edge in the gap to reduce the collected air pressure until a condition of equilibrium is attained.

Air Jet Effect

Figure 4:
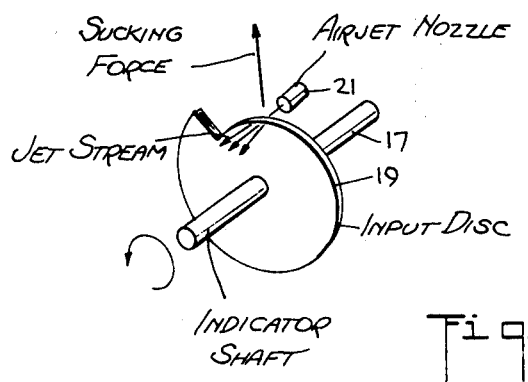
FIG. 4 illustrates the air-jet effect encountered with the edge sensor.

The feedback force imposed on feedback arm 22 acts in opposition to the effect of the input disc on the edge sensor to an extent tending to hold this arm motionless. Ideally, the edge sensor serves only to detect the contour of the input disc without in any way affecting the angular position of this disc. It has been found, however, that, the shown in FIG. 4, the stream of air projected by a jet 21 and impinging on the edge of disc 19 gives rises aerodynamically to a sucking force which slightly displaces the disc. It was observed that this sucking force shifts pointer 18 on shaft 17 about 1% of full scale when the supply air was applied.

Inasmuch as the sucking force pulls the disc in a direction normal to its contour, which has a slope as a function of the total rise of the float, the input disc rotates the indicator shaft against the magnetic coupling force between the float and the follower magnet. This results in a deviation from the true indicator position.

Figure 5:
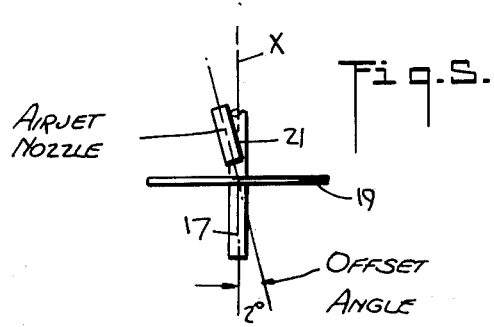
FIG. 5 shows the manner in which the air-jet effect is corrected.

In order to alleviate this air jet effect, air jet nozzle 21 is positioned with respect to the axis X of shaft 17 on which disc 19 is mounted at an offset angle which is just sufficient to counteract the air jet effect. As shown in FIG. 5, the plane of disc 19 is normal to axis X and air jet nozzle 21 is cocked 2 degrees with respect to axis X to produce a counterbalancing force on input disc 19. The exact angle required to balance the air jet effect is a function of the jet nozzle design, the supply pressure and other factors. The 2-degree cocking angle is therefore merely illustrative of the principle underlying the invention, for in practice other cocking angles may be appropriate.

While there has been shown and described a preferred embodiment of a pneumatic transmitter for variable area flowmeter in accordance with the invention, it will be appreciated that many changes and modifications may be made therein without, however, departing from the essential spirit thereof.

I claim:

1. A variable-area flowmeter system adapted to produce a transmittable pneumatic output that is linearly proportional to fluid flow rate, said system comprising:
   A. a variable area tube through which the fluid to be metered is conducted;
   B. a float disposed in said tube to be raised and lowered therein as a function of flow rate, and a bar magnet physically coupled to said float and axially movable therewith.
   C. a shaft-mounted follower magnet magnetically coupled to the bar magnet whereby the axial movement of the bar magnet is translated into rotary motion.
   D. an edge-profiled disc mounted on said shaft, said profile affording a linear relationship between rotation of said disc and the pneumatic output of said system; and
   E. means including a pneumatic edge sensor associated with said disc to produce said pneumatic output signal, said edge sensor being constituted by an air jet nozzle to produce an air stream which is picked up by a collector spaced therefrom by a gap in which the edge of the disc is inserted to more or less interrupt the stream in accordance with the profile, said nozzle being cocked relative to the plane of the disc to an extent counteracting the tendency of the stream to rotate the disc.

2. A system as set forth in claim 1, further including a pivoted feedback arm on which the edge sensor is mounted, and a negative feedback loop coupled to the collector to shift the arm in a direction and to an extent causing said arm to assume an equilibrium position.

3. A system as set forth in claim 2, wherein said arm is pivoted from a frame on which is mounted a feedback bellows which is responsive to the output of said collector to shift said arm.

4. A system as set forth in claim 3, further including a supply of pressurized air coupled to said jet nozzle, a pneumatic relay operated by said supply, the input of said relay being coupled to said bellows.

5. A system as set forth in claim 4, further including a restriction interposed between said collector and said relay.

6. A system as set forth in claim 4, further including an adjustable range spring connected between said frame and said feedback arm.

7. A system as set forth in claim 6, wherein said relay provides an output in the 3 to 15 psi range.

8. A system as set forth in claim 1, wherein said nozzle is cocked about 2° relative to the axis of the shaft.

9. A system as set forth in claim 1, wherein said shaft is provided with an eccentric mass.

10. A system adapted to produce a transmittable pneumatic output that is linearly proportional to a process variable, said system comprising:
  A. means to rotate a shaft to an angular degree in accordance with said variable;
  B. an edge-profiled disc mounted on said shaft, said profile affording a linear relationship between rotation of said disc and the pneumatic output of said system; and
  C. means including a pneumatic edge sensor associated with said disc to product said pneumatic output signal, said edge sensor being constituted by an air jet nozzle to produce an air stream which is picked up by a collector spaced therefrom by a gap in which the edge of the disc is inserted to more or less interrupt the stream in accordance with the profile, said nozzle being cocked relative to the plane of the disc to an extend counteracting the tendency of the stream to rotate the disc.

* * * * *

UNITED STATES PATENT AND TRADEMARK OFFICE
CERTIFICATE OF CORRECTION

PATENT NO. : 4,019,369
DATED : April 26, 1977
INVENTOR(S) : Toshio Satori

It is certified that error appears in the above-identified patent and that said Letters Patent are hereby corrected as shown below:

IN THE ABSTRACT - line 18 "ouput" should have read -- output --
Column 1, line 49 "magnetic" should have read -- magnet --
Column 4, line 44 "thereofre" should have read
    -- therefore --
Column 5, line 61 "the" 1st occurrence should have read -- as --
Claim 4, line 4 after "said" the following should have been inserted before the word "bellows" -- collector and the output of said relay being coupled to said --
Claim 10, Paragraph C, line 6 "product" should have read
-- produce --    line 13, "extend" should have read
-- extent --

Signed and Sealed this sixteenth Day of August 1977

[SEAL]

Attest:

RUTH C. MASON
*Attesting Officer*

C. MARSHALL DANN
*Commissioner of Patents and Trademarks*